(12) United States Patent
Iwata et al.

(10) Patent No.: US 10,399,114 B2
(45) Date of Patent: Sep. 3, 2019

(54) APPARATUS AND METHOD FOR MANUFACTURING TOW PREPREG

(71) Applicants: Mizuno Corporation, Osaka-shi (JP); Mizuno Technics Corporation, Gifu-ken (JP)

(72) Inventors: Mototaka Iwata, Osaka (JP); Akiyoshi Utsumi, Gifu-ken (JP)

(73) Assignees: Mizuno Corporation, Osaka (JP); Mizuon Technics Corporation, Gifu-ken (JP)

( * ) Notice: Subject to any disclaimer, the term of this patent is extended or adjusted under 35 U.S.C. 154(b) by 234 days.

(21) Appl. No.: 15/291,889

(22) Filed: Oct. 12, 2016

(65) Prior Publication Data

US 2017/0106405 A1 Apr. 20, 2017

(30) Foreign Application Priority Data

Oct. 14, 2015 (JP) ................................. 2015-202874

(51) Int. Cl.
| | |
|---|---|
| *B05D 1/28* | (2006.01) |
| *B05C 1/08* | (2006.01) |
| *B05C 11/10* | (2006.01) |

(52) U.S. Cl.
CPC .................. *B05D 1/28* (2013.01); *B05C 1/08* (2013.01); *B05C 11/10* (2013.01)

(58) Field of Classification Search
None
See application file for complete search history.

(56) References Cited

U.S. PATENT DOCUMENTS

| | | | | | |
|---|---|---|---|---|---|
| 1,281,728 | A | * | 10/1918 | Weinheim | B29D 29/00 427/176 |
| 2,993,526 | A | * | 7/1961 | Young | B29C 53/60 156/155 |
| 5,037,284 | A | * | 8/1991 | Angell, Jr. | B29B 15/122 264/135 |
| 2010/0058985 | A1 | * | 3/2010 | Kim | G03F 7/16 118/720 |

FOREIGN PATENT DOCUMENTS

| | | |
|---|---|---|
| JP | 2001040119 A | 2/2001 |
| JP | 2003266551 A | 9/2003 |

* cited by examiner

*Primary Examiner* — Jethro M. Pence
(74) *Attorney, Agent, or Firm* — Loza & Loza, LLP; Mark A. Wilson (57) ABSTRACT

A tow prepreg manufacturing apparatus applies resin to an original tow of reinforcing fibers. The tow prepreg manufacturing apparatus includes an oiling roller, a scraper, a resin reservoir, a tube pump, and a controller. The oiling roller is supplied with resin while rotating at a predetermined rotation speed. The scraper adjusts the shape of the resin supplied onto the oiling roller. The resin reservoir supplies resin to the oiling roller. The tube pump discharges resin to the resin reservoir. The controller controls the tube pump so that the amount of resin held in the resin reservoir remains constant and controls the rotation speed of the oiling roller so that a resin content of a wound tow prepreg becomes equal to a target resin content.

12 Claims, 7 Drawing Sheets

APPARATUS AND METHOD FOR MANUFACTURING TOW PREPREG

BACKGROUND OF THE INVENTION

The present invention relates to an apparatus and a method for manufacturing tow prepreg and, more particularly, to the control of the amount of resin applied to an original tow of reinforcing fibers (glass fibers, carbon fibers, or the like).

An apparatus for manufacturing tow prepreg impregnates glass fibers or carbon fibers, which serve as an original tow of reinforcing fibers, with resin. As a method to apply resin to the original tow of fibers, a kiss coating method is known. Japanese Laid-Open Patent Publication Nos. 2003-266551 and 2001-40119 each describe an example of a tow prepreg manufacturing apparatus that feeds resin to a rotating roller and adjusts the clearance between the blade and the roller to adjust the applied amount of resin.

Compared to a method of coating an original tow directly with resin, the kiss coating method as a resin application method allows resin to be more uniformly applied to the surface of the original tow and eliminates differences in the applied amount of resin. Further, compared to a bucket process and a dipping process that dips an original tow in resin, foaming of the resin can be reduced and thus can obviate the application of resin that includes bubbles to the original tow.

The original fibers are filament aggregate and thus include many voids that of various sizes. Further, the original tow has a non-uniform thickness and width. It is thus difficult to converge the resin content of the wound tow prepreg (Rc value: applied resin weight/tow prepreg weight) on the desired value just by adjusting the clearance between the roller and the blade. Further, when performing resin impregnation, the temperature of the resin is raised when feeding the resin to the roller. In this case, resin falls from the roller and from a scraper before resin impregnation occurs. This also makes it difficult to keep the Rc value constant.

SUMMARY OF THE INVENTION

It is an object of the present invention to provide a tow prepreg manufacturing apparatus that converges the content of resin in a tow prepreg on a desired value throughout the wound tow prepreg.

To achieve the above object, a tow prepreg manufacturing apparatus according to one aspect of the present invention applies resin to an original tow of reinforcing fibers. The tow prepreg manufacturing apparatus includes an oiling roller, a scraper, a resin reservoir, a tube pump, and a controller. The oiling roller is supplied with resin while rotating at a predetermined rotation speed. The scraper adjusts the shape of the resin supplied onto the oiling roller. The resin reservoir supplies resin to the oiling roller. The tube pump discharges resin to the resin reservoir. The controller controls the tube pump so that the amount of resin supplied from the resin reservoir remains constant and controls the rotation speed of the oiling roller so that a resin content of a wound tow prepreg becomes equal to a target resin content.

A method for manufacturing tow prepreg according to a further aspect of the present invention includes supplying an oiling roller with resin from a resin reservoir, moving an original tow of reinforcing fibers over the oiling roller to apply resin to the original tow, and executing a resin discharge control and an oiling roller rotation speed control in parallel. The resin discharge control keeps the amount of resin supplied from the resin reservoir constant, and the oiling roller rotation speed control controls a rotation speed of the oiling roller to converge a resin content of a wound tow prepreg on a target resin content and adjust the amount of resin supplied to the original tow from the oiling roller.

In such configurations, the rotation speed of the oiling roller is feedback-controlled in accordance with the resin content of the wound tow prepreg and the target resin content so that the amount of resin applied to the original tow converges on a constant value. This supplies the tow prepreg with stable quality.

More specifically, the rotation speed of the oiling roller is controlled to adjust the amount of resin supplied to the original tow so that the amount of resin supplied to the oiling roller remains constant and so that the Rc value of the wound prepreg converges on the target Rc value. Thus, the resin content of the tow prepreg is converged on a constant value throughout the wound tow prepreg, and the tow prepreg is supplied with constant quality.

Preferably, the amount of resin delivered to the resin reservoir is feedback-controlled in accordance with the liquid level in the resin reservoir. This allows the amount of resin in the resin reservoir to be accurately and automatically calculated.

Preferably, the rotation speed of the oiling roller is variable to enable adjustment of the amount of resin applied to the original tow. This allows the resin content of the wound tow prepreg to be accurately calculated.

Preferably, the resin content of the wound tow prepreg is calculated from the amount of resin actually applied to the original tow. This allows the resin content of the wound tow prepreg to be accurately calculated and the rotation speed of the oiling roller to be accurately controlled.

Preferably, resin is held in a cavity formed between the oiling roller and the resin reservoir, and the held resin is supplied to the oiling roller. This allows the amount of resin in the resin reservoir to be controlled and stabilizes the amount of resin supplied to the oiling roller. Further, the oiling roller comes into contact with a sufficient amount of resin before supplying the resin to the oiling roller. This stably supplies resin to the oiling roller.

Preferably, the lateral width between parallel portions of the resin reservoir is reduced in a stepped manner. This rectifies the flow of the resin supplied to the oiling roller in the resin reservoir and stabilizes the supply of resin.

Preferably, a third weight scale detects the weight of the resin that falls from a travel path of the tow prepreg at the downstream side of the oiling roller. This allows the resin content of the wound tow prepreg to be calculated with further accuracy and the oiling roller rotation speed control to be executed with further accuracy.

DETAILED DESCRIPTION OF THE PREFERRED EMBODIMENTS

Figure 1:
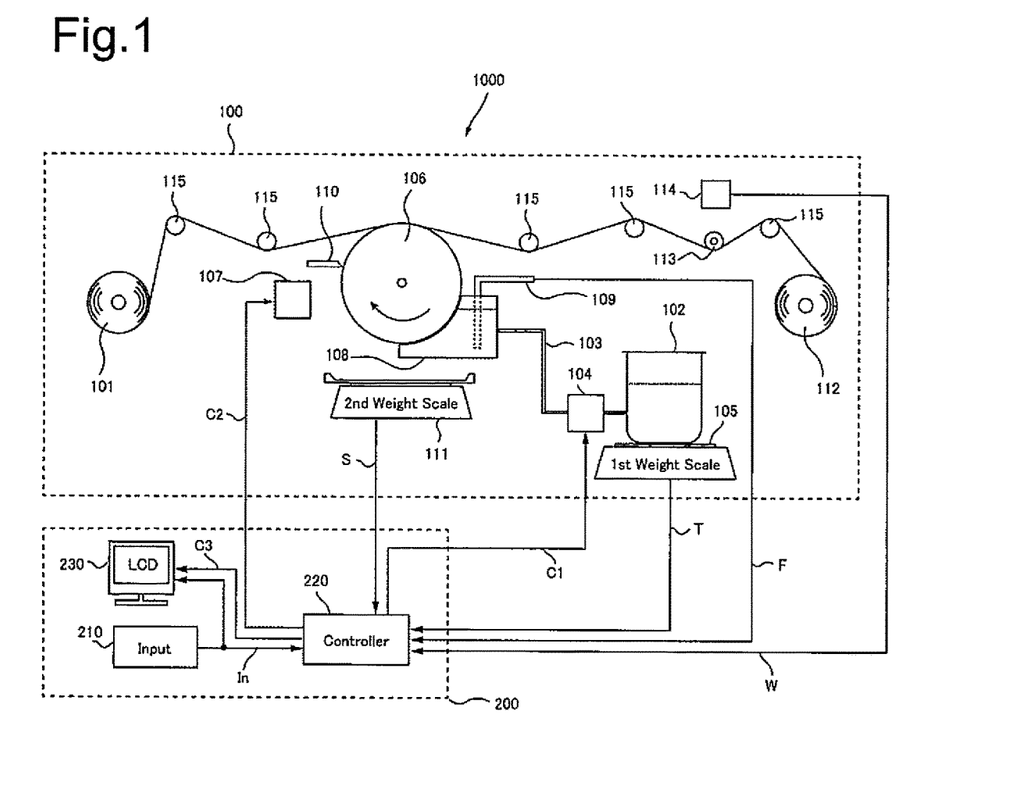
FIG. 1 is a diagram showing the entire structure of a tow prepreg manufacturing apparatus according to one embodiment of the present invention.

FIG. 1 is a diagram showing the entire structure of one embodiment of a tow prepreg manufacturing apparatus 1000. As shown in FIG. 1, the tow prepreg manufacturing apparatus 1000 includes a tow prepreg formation unit 100 and an operation unit 200. The tow prepreg formation unit 100 draws an original tow, applies resin to the original tow, and winds up the tow prepreg. The operation unit 200 controls the amount of resin applied to the original tow so that the Rc value of the formed tow prepreg matches a target value. In the present embodiment, carbon fibers are used as the original tow.

The structure of the tow prepreg formation unit 100 will now be described.

Referring to FIG. 1, an original tow is fed from a tow feeding package 101. The carbon fibers are bundled into a tow to form the original tow and wound around the tow feeding package 101. A resin tank 102 contains resin with which the original tow is impregnated. A heater (not shown) keeps the temperature of the resin tank 102 optimum in accordance with the viscous properties of the used resin. The resin is, for example, a thermosetting epoxy resin. The resin flows out of the resin tank 102 through a tube 103.

A tube pump 104 discharges resin out of the tube 103. The tube pump 104 includes rollers that are rotated at a certain speed to force out and discharge resin from the tube 103. The rotation speed of the tube pump 104 is controlled by a controller 220 which is an element of the operation unit 200. The rotation speed of the tube pump 104 can be set to a certain rotation speed in accordance with a control signal C1 output from the controller 220. The controller 220 will be described in detail later.

A first weight scale 105 detects the weight of the resin tank 102. The measurement value T of the first weight scale 105 is sent to the controller 220 in predetermined sampling cycles. An oiling roller 106 applies resin to the original tow. As the oiling roller 106 rotates at a certain speed in the direction indicated by the arrow, resin is supplied to the surface of the oiling roller 106. While the original tow travels along the surface of the oiling roller 106, resin is applied to one side of the original tow. The controller 220 controls an oiling roller driver 107 that drives the oiling roller 106. The controller 220 outputs a control signal C2 that sets the oiling roller 106 to a certain rotation speed. In the present embodiment, a control for driving a drive device that moves the original tow from the tow feeding package 101 to a winding bobbin 112 is performed separately from the control for driving the oiling roller 106.

The resin reservoir 108 supplies the resin discharged from the tube 103 onto the oiling roller 106. The resin reservoir 108 is a box-shaped member and is in contact with the oiling roller 106. The resin reservoir 108 includes a cavity that holds the resin between the surface of the oiling roller 106 and inner wall surfaces of the resin reservoir 108. Preferably, the resin reservoir 108 is formed from a material that produces little friction. In the present embodiment, the oiling roller 106 is formed from polycarbonate.

Figure 2:
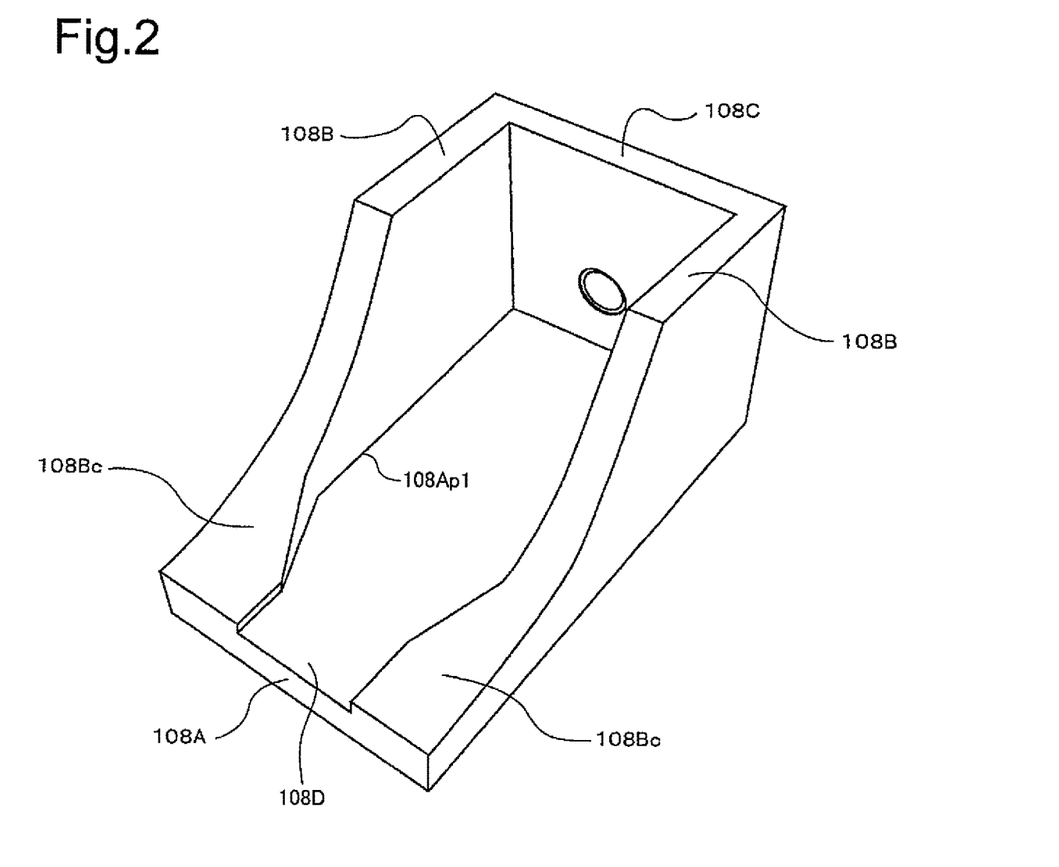
FIG. 2 is a perspective view of a resin reservoir shown in FIG. 1.
Figure 3:
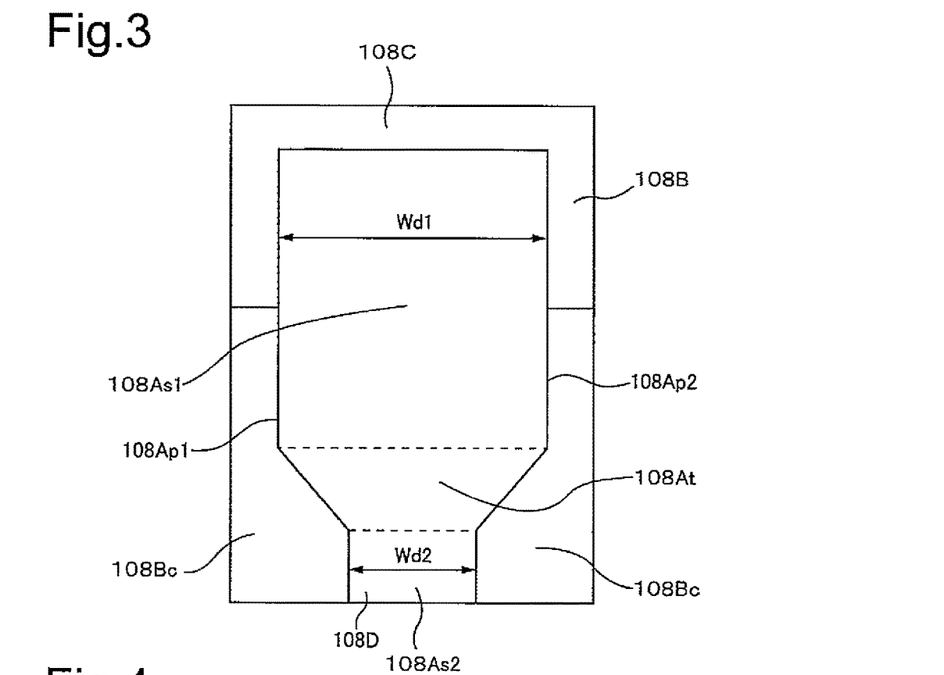
FIG. 3 is a plan view of the resin reservoir shown in FIG. 2.
Figure 4:
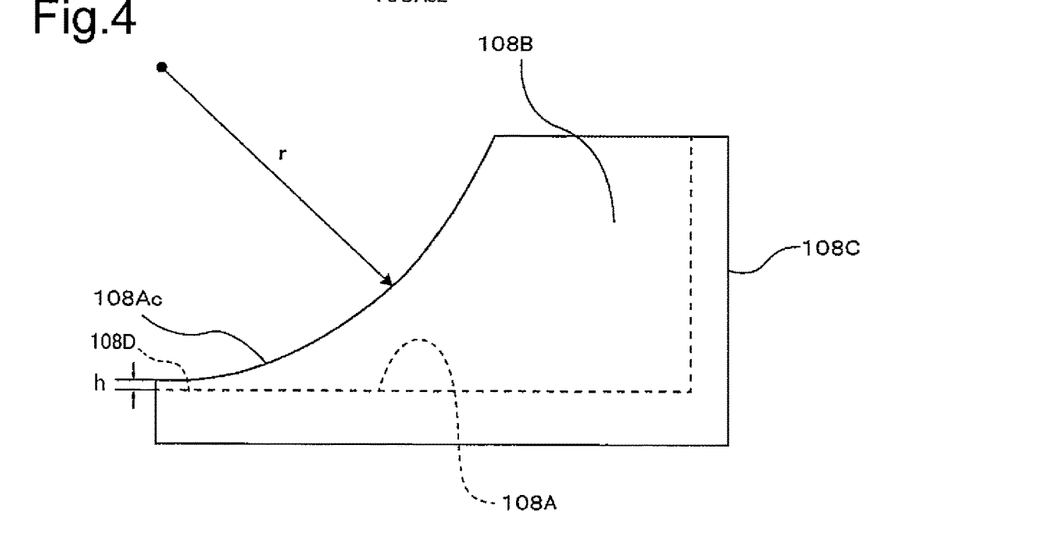
FIG. 4 is a right view of the resin reservoir shown in FIG. 2.
Figure 5:
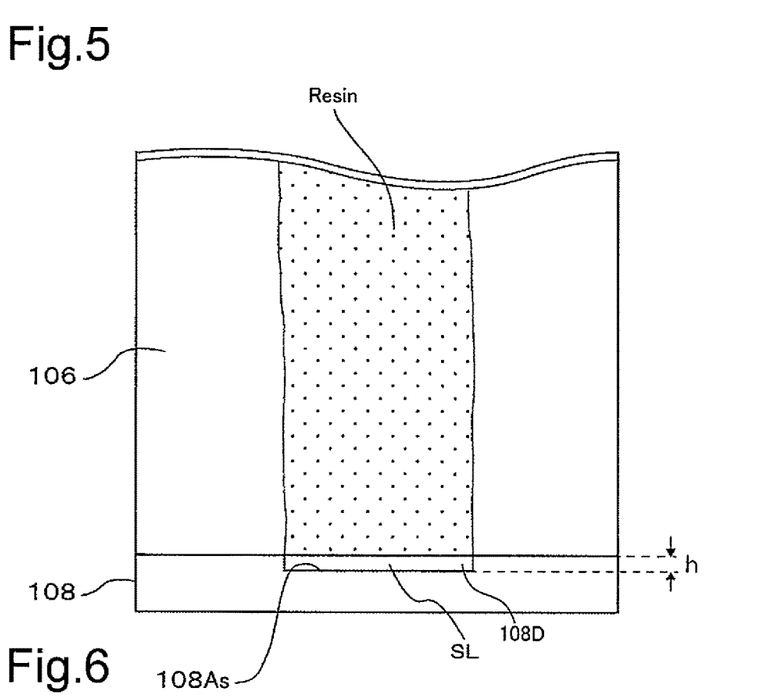
FIG. 5 is a front view of an oiling roller in contact with and the resin reservoir of FIG. 1.

FIG. 2 is a perspective view of the resin reservoir 108. FIG. 3 is a plan view of the resin reservoir 108, and FIG. 4 is a right view of the resin reservoir 108. Further, FIG. 5 is a front view showing the oiling roller 106 in contact with the resin reservoir 108.

As shown in FIG. 2, the resin reservoir 108 includes a bottom wall 108A, side walls 108B, and a rear wall 108C. The bottom wall 108A has a rectangular contour in a plan view. The side walls 108B and the rear wall 108C vertically project from the edges of the bottom wall 108A.

As shown in FIG. 3, the inner surface of the bottom wall 108A, that is, the bottom surface of the resin reservoir 108, includes a first straight region 108As1, a tapered region 108At, and a second straight region 108As2. The first straight region 108As1 has width Wd1. The tapered region 108At reduces the width Wd1 to width Wd2. The second straight region 108As2 is rectangular and extends from the narrow end of the tapered region 108At. In this manner, the rectangular region on the bottom surface of the resin reservoir 108 surrounded by the side walls 108B and the rear wall 108C is shaped to be constricted in steps by the tapered region 108At. More specifically, the bottom surface of the resin reservoir 108 includes parallel portions 108Ap1 and 108Ap2 between the side walls 108B. The lateral width between the parallel portions 108Ap1 and 108Ap2 is narrowed in steps.

As shown in FIG. 4, each side wall 108B has a contour shaped as if one corner of a rectangle were cut away along an arc. The upper side of the side wall 108B extends horizontally from one end of the arc. The arc has a radius r that is equal to the radius of the oiling roller 106. The arcuate portion has an arc length that is 20% to 30% of the outer circumferential length of the oiling roller 106, preferably, 20% to 25% of the outer circumferential length of the oiling roller 106. The lower end of the arcuate portion is located at a position separated by length h toward the upper side from the inner surface of the bottom wall 108A. The length h is obtained by adding a margin of 0.1 to 0.5 mm to the clearance between a scraper 110 and the oiling roller 106.

Each side wall 108B extends in the horizontal direction along an inner edge and an outer edge on the bottom wall 108A and extends in the vertical direction from the bottom wall 108A in conformance with the shape of its upper side. As shown in FIGS. 2 and 3, each side wall 108B includes a roller contact surface 108Bc that comes into contact with the oiling roller 106. The second straight region 108As2 of the bottom wall 108A and the side walls 108B form a groove 108D having height h.

The rear wall 108C projects vertically from the bottom wall 108A to the same height as the side walls 108B. An adapter (not shown) is connected to the rear wall 108C. The tube 103 is connected to the adapter.

The resin reservoir 108 is held in contact with the oiling roller 106 and fixed to the tow prepreg formation unit 100 by a fastener (not shown). The surface of the oiling roller 106, the bottom wall 108A, the side walls 108B, and the rear wall 108C form a cavity in which resin can be held. Further, as shown in FIG. 5, a slit SL having height h is formed between the oiling roller 106 and the second straight region 108As2. In other words, the slit SL is defined between the oiling roller 106 and the groove 108D. The resin is supplied onto the oiling roller 106 via the slit SL little by little, and thereby a resin layer having height h is formed on the oiling roller 106.

The resin held in the resin reservoir 108 is moved toward the slit SL and ultimately supplied onto the oiling roller 106 through the slit SL. Further, the width Wd1 of the first straight region 108As1 defined on the inner surface of the bottom wall 108A is changed to the width Wd2 of the second straight region As2. In this case, if the width of the first straight region 108As1 were continuously and directly changed to the width of an exit edge of the slit SL, the resin would flow in the resin reservoir 108 at a rate that differs between the middle portion and the outer portion, which is located in the vicinity of the side walls 108B. Thus, non-uniform resin will flow out of the resin reservoir 108. In this regard, resin in the resin reservoir 108 in the present invention flows from the first straight region 108As1 via the tapered region 108At, which reduces the width Wd1 to the width Wd2, and out of the second straight region 108As2. Thus, the flow of resin is rectified in the second straight region 108As2 toward the exit edge of the slit SL. This limits non-uniform flows of the resin and allows resin to be uniformly supplied onto the oiling roller 106.

The arc length of each roller contact surface 108Bc that contacts the oiling roller 106 is about 20% to 30% of the circumferential length of the oiling roller 106, preferably, about 20% to 25% of the circumferential length of the oiling roller 106. Thus, after the oiling roller 106 performs resin application, the oiling roller 106 can come into contact with a sufficient amount of resin so that resin can be stably held on the oiling roller 106. Particularly, in the tow prepreg formation unit 100 according to the present invention, the liquid level is kept constant in the resin reservoir 108. Thus, the oiling roller 106 always contacts a constant amount of resin after performing resin application.

In the present embodiment, the width of the inner bottom surface in the resin reservoir 108 is reduced by a single step. However, the resin reservoir 108 may include multiple tapered regions to reduce the width in multiple steps.

Referring to FIG. 1, a liquid level sensor 109 detects the liquid level height of the resin inside the resin reservoir 108. The liquid level sensor 109 detects the liquid level in the resin reservoir 108 from electrical signals applied to electrodes extending through the liquid level sensor 109. Then, the liquid level sensor 109 outputs the detected liquid level height F to the controller 220.

The scraper 110 adjusts the shape of the resin on the oiling roller 106. More specifically, the scraper 110 spreads the resin on the oiling roller 106 to a uniform thickness. The resin from the resin reservoir 108 applied to the oiling roller 106 may fall off the oiling roller 106 and be deformed before reaching the scraper 110. The scraper 110 functions to adjust the shape of such deformed resin. The scraper 110 is fixed at a position separated by a predetermined distance from the oiling roller 106. The fixed position of the scraper 110 relative to the oiling roller 106 is changed in accordance with the thickness of the original tow, preferably, within a range that is about one to three times greater than the thickness of the original tow.

A second weight scale 111 detects the weight of the resin that falls from the resin reservoir 108, the oiling roller 106, and the scraper 110. The second weight scale 111, which is located below the oiling roller 106, includes a tray that receives the fallen resin. The measurement value S of the second weight scale 111 is output to the controller 220 in predetermined sampling cycles.

The formed tow prepreg is wound around a winding bobbin 112. A length measurement roller 113 measures the winding length of the tow prepreg wound around the winding bobbin 112. The length measurement roller 113 is held on the tow prepreg at the upstream side of the winding bobbin 112. A winding counter 114 is electrically connected to the length measurement roller 113. The winding counter 114 outputs the tow prepreg winding length W to the controller 220. Rotation rollers 115 stabilize the movement of the original tow drawn from the tow feeding package 101 and the movement of the tow prepreg, which is obtained by applying resin to the original tow.

In the tow prepreg formation unit 100 constructed as the above, the original tow drawn from the tow feeding package 101 is sent to the oiling roller 106 with assistance of rollers arranged in the travel path of the original tow. The controller 220 feedback-controls the rotation speed of the oiling roller 106. According to the feedback control, the optimum amount of resin is supplied to the original tow so that the resin content of the wound tow prepreg becomes equal to the target Rc value. Consequently, the tow prepreg in which the resin content is converged on the target Rc value over the entire length of the tow prepreg is formed as the original tow travels over the oiling roller 106.

The operation unit 200 will now be described.

As shown in FIG. 1, the operation unit 200 includes an input 210, the controller 220, and a display 230. Various types of set values In are input to the input 210 from external devices. The controller 220 controls the amount of resin supplied from the oiling roller 106 to the original tow so that the resin content of the wound tow prepreg is converged on the target Rc value. The display 230 receives a control signal C3 from the controller 220 and shows the control conditions of the tow prepreg formation unit 100 in real time.

The operation of the operation unit 200 will now be described. The operation unit 200 functions to optimize the amount of resin applied to the original tow so that the Rc value of the formed tow prepreg becomes equal to the target value. More specifically, three factors are used to determine the resin amount, namely, the distance between the scraper 110 and the oiling roller 106, the amount of resin supplied onto the oiling roller 106 and the rotation speed of the oiling roller 106.

In the tow prepreg manufacturing apparatus 1000 according to the present invention, among the three factors, the distance between the oiling roller 106 and the scraper 110 is set to a fixed value. The amount of resin supplied onto the oiling roller 106 is controlled to remain constant. The rotation speed of the oiling roller 106 is controlled to adjust the amount of resin supplied from the oiling roller 106 to the original tow. These converge the Rc value of the wound tow prepreg on the target Rc value. In the present embodiment, the controller 220 executes a resin discharge control and an oiling roller rotation speed control in parallel. The resin discharge control controls the amount of resin discharged by the tube pump 104 so that the amount of resin in the resin reservoir 108 remains constant. The oiling roller rotation speed control changes the rotation speed of the oiling roller 106 to change the amount of resin supplied from the oiling roller 106 to the original tow to the desired value.

The resin discharge control and the oiling roller rotation speed control executed by the controller 220 will now be described.

Figure 6:
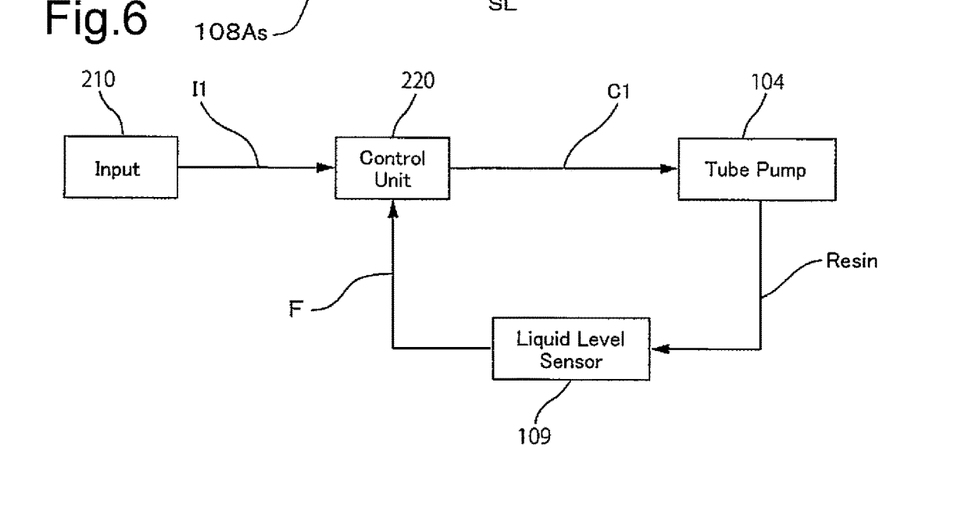
FIG. 6 is a block diagram illustrating resin discharge control.

FIG. 6 is a block diagram illustrating the resin discharge control. As shown in FIG. 6, a reference liquid level value I1 of the resin reservoir 108 is set in the controller 220 by the input 210. The reference liquid level value I1 may be set to any value. The controller 220 outputs the control signal C1 to the tube pump 104. The control signal C1 indicates increases and decreases in the rotation speed of the tube pump 104. The liquid level sensor 109 outputs liquid level information to the controller 220. The detected liquid level height F of the resin reservoir 108 serves as the liquid level information.

Before the resin discharge control is initiated, the reference liquid level value I1 is set in the controller 220 by the input 210 and a constant amount of resin is delivered to the resin reservoir 108. Further, the tow prepreg formation unit 100 is driven to supply resin onto the oiling roller 106 from the slit SL in the bottom surface of the resin reservoir 108. Then, the resin discharge control is initiated.

Figure 7:
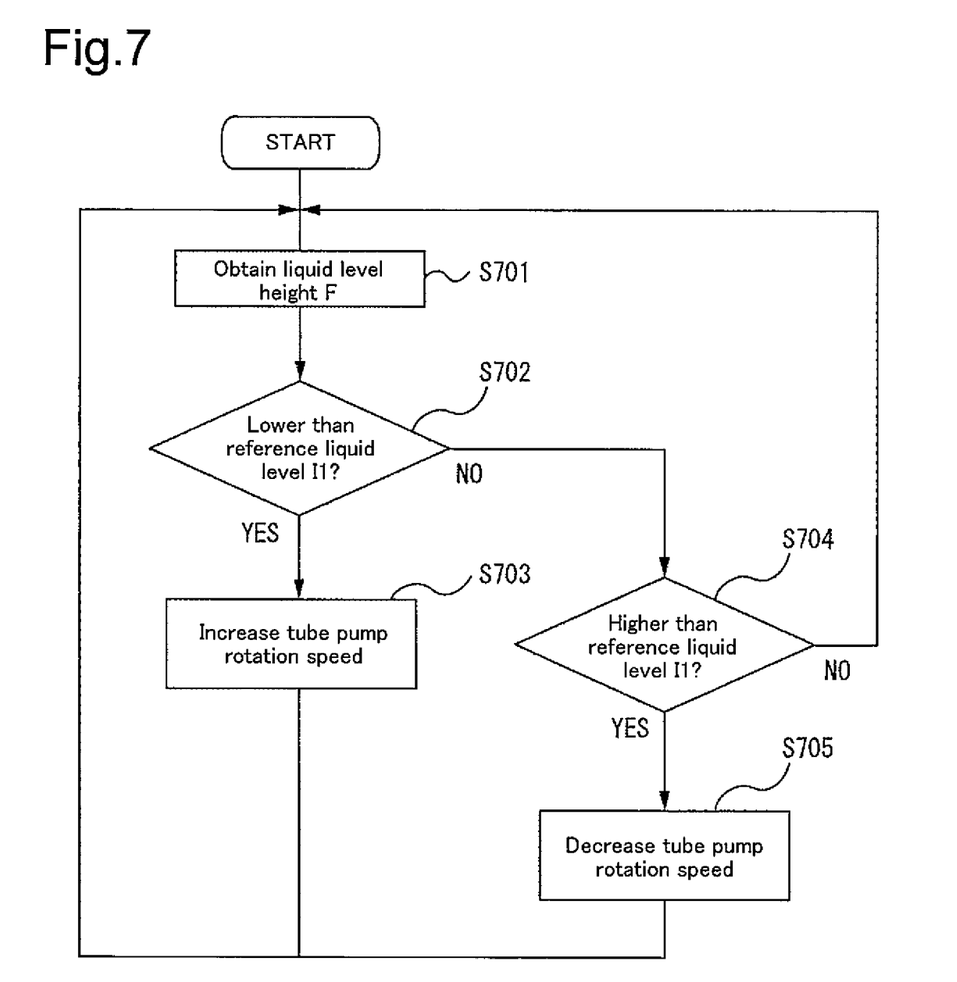
FIG. 7 is a flowchart illustrating resin discharge control.

FIG. 7 is a flowchart illustrating the resin discharge control. First, the liquid level sensor 109 sends the liquid level height F of the resin reservoir 108 to the controller 220 (step 701, hereinafter referred to as S701). Then, the controller 220 obtains the difference between the reference liquid level value I1 of the resin reservoir 108 and the present liquid level height F to determine whether or not the present liquid level height F is lower than the reference liquid level value I1 (S702). When the present liquid level height F is lower than the reference liquid level value I1, the controller 220 outputs a control signal C1 to increase the rotation speed of the tube pump 104 (S703).

When the present liquid level height F is not lower than the reference liquid level value I1 in S702, the controller 220 further determines whether or not the present liquid level height F is higher than the reference liquid level value I1 (S704). When the liquid level is higher than the reference liquid level value I1 in S704, the controller 220 outputs a control signal C1 to decrease the rotation speed of the tube pump 104 (S705). When the liquid level is not higher than the reference liquid level value I1 in S704, the controller 220 determines that the liquid level height F is the reference liquid level value I1 and returns to S701 to continuously perform the steps from S701.

Subsequent to S703 or S705, the controller 220 returns to S701 and feedback-controls the rotation speed of the tube pump 104 based on the liquid level height F input to the controller 220 until the liquid level in the resin reservoir 108 becomes equal to the reference liquid level value I1. Further, the steps of S701 to S705 are continuously performed until the winding of the tow prepreg is completed so that the liquid level of the resin reservoir 108 is controlled to remain constant. Additionally, a constant amount of resin is supplied from the slit SL of the resin reservoir 108.

The oiling roller rotation speed control will now be described.

Figure 8:
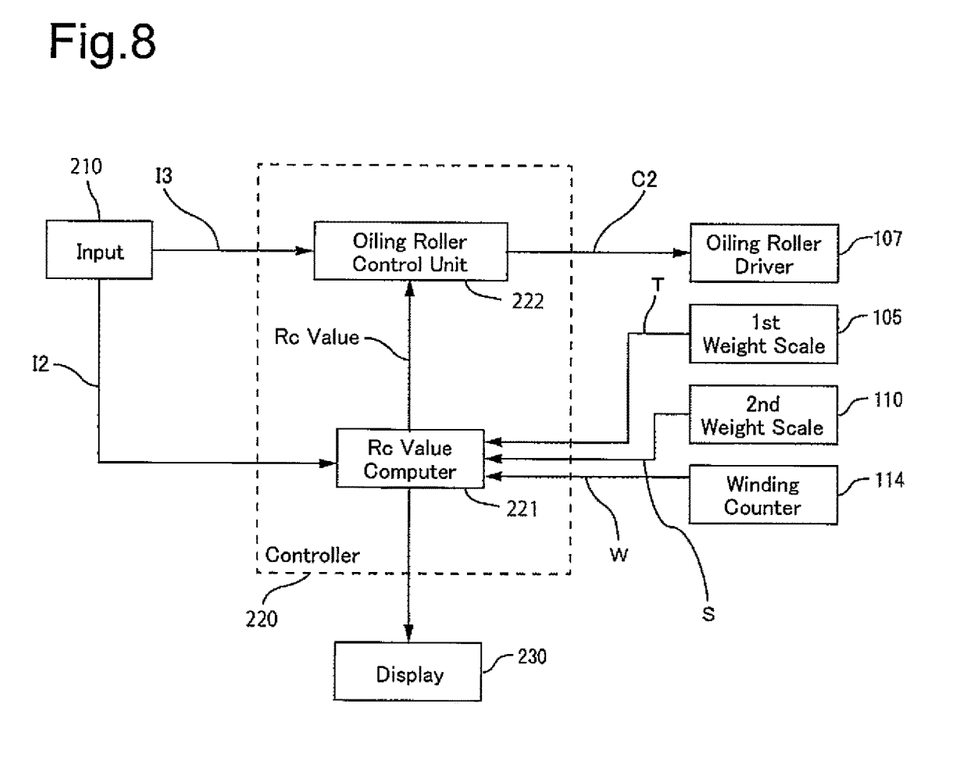
FIG. 8 is a block diagram illustrating oiling roller rotation speed control.

FIG. 8 is a block diagram illustrating the oiling roller rotation speed control. As shown in FIG. 8, an Rc value computer 221 computes the Rc value of the wound tow prepreg. The Rc value computer 221 is one of the functional blocks of the controller 220. Before the oiling roller rotation speed control is initiated, a set value I2, which is used to compute the Rc value, is input by the input 210 to the Rc value computer 221. The set value I2 includes the original tow weight per unit length TEX and the finished overall length E. The original tow weight per unit length TEX is calculated from "tow feeding package weight/packaged tow length" and set to the Rc value computer 221 by the input 210 whenever the tow feeding package 101 is replaced. The finished overall length E is the target length of the tow prepreg wound around the winding bobbin 112 and input in accordance with the specified length of the final product.

The Rc value computer 221 periodically receives the measurement value T of the resin tank 102 measured by the first weight scale 105, the measurement value S of the fallen resin measured by the second weight scale 111, and the tow prepreg winding length W measured by the winding counter 114.

Referring to FIG. 8, an oiling roller control unit 222 controls the rotation speed of the oiling roller 106. The oiling roller control unit 222 is one of the functional blocks of the controller 220. A target Rc value I3 is set by the input 210 to the oiling roller control unit 222. Further, the oiling roller control unit 222 receives the Rc value calculated by the Rc value computer 221. The oiling roller control unit 222 executes Proportional-Integral-Differential (PID) control for each sampling time on the rotation speed of the oiling roller 106 based on the target Rc value I3 and the present Rc value to supply the optimum amount of resin onto the oiling roller 106 so that the resin content of the wound tow prepreg becomes equal to the target Rc value I3. The PID control in the present embodiment is a typical control method for feedback-controlling a control amount using, as an input value, a corrected control amount calculated through proportional control, a corrected control amount calculated through integral control, and a corrected control amount calculated through differential control. More specifically, in the proportional control, a corrected control amount is obtained in proportion to the difference of the output value (present Rc value) and the target value (target Rc value I3). In the integral control, a corrected control amount is obtained from the integral value of the difference from when the operation started to the present point of time. In the differential control, a corrected control amount is obtained to reduce the rate at which the difference increases or decreases. This control method is used so that the oiling roller control unit 222 outputs the control signal C2, which controls the rotation speed of the oiling roller 106, to the oiling roller driver 107.

Before the oiling roller rotation speed control is initiated, the original tow weight per unit length TEX, the finished overall length E, and the target Rc value I3 are set. Further, the tow prepreg formation unit 100 is driven to supply resin onto the oiling roller 106 from the bottom surface opening (slit SL) in the resin reservoir 108. Then, the oiling roller rotation speed control is initiated.

Figure 9:
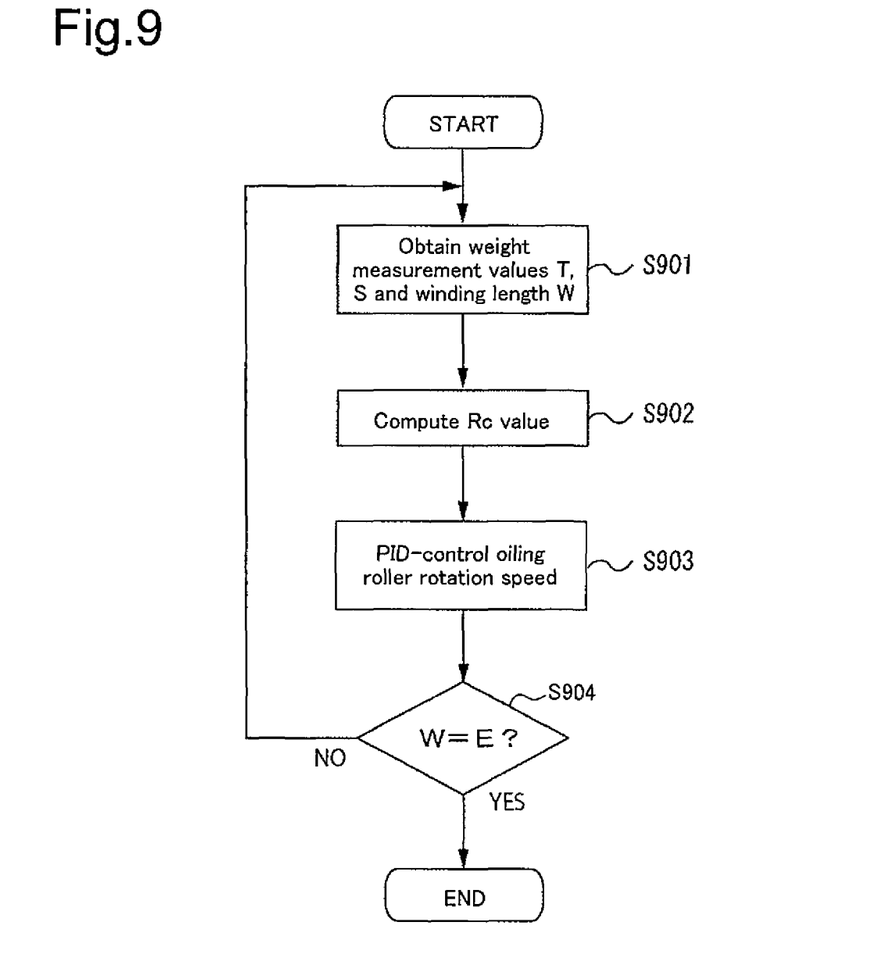
FIG. 9 is a flowchart illustrating oiling roller rotation speed control.

FIG. 9 is a flowchart illustrating the oiling roller rotation control. First, in step S901, the measurement value T of the weight of the resin tank 102, the measurement value S of the weight of the resin that has fallen from the oiling roller 106, and the tow prepreg winding length W detected by the length measurement roller 113 are input to the Rc value computer 221.

Then, the Rc value computer 221 computes the present Rc value of the tow prepreg from the measurement values T and S and the winding length W that were measured in step S901 and the set value I2 that was initially input (S902). More specifically, the present applied resin weight C, that is, the amount of resin applied to the wound tow prepreg is calculated from equation 1, which is shown below, using the initial measurement value T0 of the resin tank 102, the present measurement value T of the resin tank 102, the initial measurement value S0 of the tray held on the second weight scale, and the present measurement value S of the tray.

$$\text{applied resin weight } C=(T0-T)-(S-S0) \qquad \text{equation 1}$$

Further, the wound fiber weight FF wound around the winding bobbin 112 is calculated from equation 2, which is shown below.

$$\text{wound fiber weight } FF=TEX \times W \qquad \text{equation 2}$$

Then, the present Rc value of the tow prepreg is calculated from Equation 3, which is shown below, using the fiber weight FF obtained through equation 2 and the applied resin weight C obtained through equation 1.

$$Rc \text{ value}=C/(FF+C)\times 100 \qquad \text{equation 3}$$

In S903, the Rc value calculated by the Rc value computer 221 is input to the oiling roller control unit 222, and the rotation speed of the oiling roller 106 is PID-controlled so that the present Rc value becomes equal to the target Rc value I3. For example, when the present Rc value is lower than the target Rc value I3, the rotation speed of the oiling roller 106 is increased to supply the original tow with more resin from the oiling roller 106.

Then, the oiling roller control unit 222 determines whether or not the present tow prepreg winding length W has reached the finished overall length E (S904). When the present tow prepreg winding length W has reached the finished overall length E, the oiling roller control unit 222 ends the oiling roller rotation speed control. When determining in S904 that the present tow prepreg winding length W has not reached the finished overall length E, the oiling roller control unit 222 returns to S901 and subsequently repeats steps S901 to S904 until the winding of the tow prepreg is completed. Further, the oiling roller control unit 222 controls the rotation speed of the oiling roller 106 so that the Rc value of the wound tow prepreg converges on the target Rc value I3.

As described above, the tow prepreg manufacturing apparatus 1000 according to the present invention fixes the position of the scraper 110 and feedback-controls the amount of resin discharged from the tube pump 104 in accordance with the actual amount of resin applied to the original tow so that the amount of resin supplied onto the oiling roller 106 remains constant.

In parallel to the resin discharge control, the rotation speed of the oiling roller 106 is feedback-controlled in accordance with the present Rc value of the wound tow prepreg so that the amount of resin supplied to the original tow from the oiling roller 106 becomes equal to the optimum resin amount for converging the present Rc value of the wound tow prepreg on the target Rc value. This maintains the amount of resin applied to the original tow at a desired value throughout the entire length of the tow prepreg and allows the tow prepreg to have constant quality.

Further, the width of the straight regions at the bottom surface of the resin reservoir is reduced in multiple steps. This rectifies the flow of resin in the resin reservoir 108 and obviates a non-uniform flow of the resin supplied to the oiling roller 106 from the resin reservoir 108. Thus, the thickness of the resin on the oiling roller 106 remains constant even before the scraper 110 performs final shaping on the resin. This ensures that the resin is shaped by the scraper 110 to a certain thickness and reduces differences in the Rc value of the tow prepreg.

In the present embodiment, the second weight scale 111 measures the weight of the resin that falls from the travel path of the original tow. In addition to the second weight scale, one or more third weight scales (not shown) may be used if necessary to measure the weight of the resin that falls from the tow prepreg manufacturing apparatus.

For example, a third weight scale may be arranged in the travel path of the tow prepreg extending from the oiling roller 106 to the winding bobbin 112 to measure the amount of resin that falls from the travel path at the downstream side of the oiling roller 106. The third weight scale output the measured resin weight to the controller 220. In this case, the difference of the present weight of a tray held on the third weight scale and the initial weight of the tray is further subtracted from the applied resin amount obtained in equation 1. This obtains the applied resin amount C (amount of resin applied to the wound tow prepreg) used for the oiling roller rotation speed control. In this configuration, the oiling roller rotation speed control may be executed with higher accuracy.

The invention claimed is:

1. A tow prepreg manufacturing apparatus that applies resin to an original tow of reinforcing fibers, the tow prepreg manufacturing apparatus comprising:
   an oiling roller supplied with resin while rotating at a predetermined rotation speed;
   a scraper that adjusts the shape of the resin supplied onto the oiling roller;
   a resin reservoir that supplies resin to the oiling roller;
   a tube pump that discharges resin to the resin reservoir; and
   a controller that executes in parallel a resin discharge control in which the tube pump is controlled so that the amount of resin supplied from the resin reservoir remains constant and an oiling roller rotation speed control in which the rotation speed of the oiling roller is controlled so that a resin content of a wound tow prepreg becomes equal to a target resin content, wherein
   the controller feedback-controls the rotation speed of the oiling roller in accordance with the resin content of the wound tow prepreg and the target resin content so that the amount of resin supplied from the oiling roller to the original tow converges the resin content of the wound tow prepreg on the target resin content.

2. The tow prepreg manufacturing apparatus according to claim 1, further comprising:
   a liquid level sensor that detects a liquid level in the resin reservoir, wherein the controller controls a drive amount of the tube pump in accordance with liquid level information output from the liquid level sensor so that a liquid level height in the resin reservoir is held at a constant value.

3. The tow prepreg manufacturing apparatus according to claim 1, further comprising:
   a first weight scale that detects the weight of the resin discharged from the tube pump; and
   a second weight scale that detects the weight of resin that falls from the oiling roller, wherein
   the controller calculates the amount of resin applied to the wound tow prepreg from an output value of the first weight scale and an output value of the second weight scale, and
   the controller calculates the resin content of the wound tow prepreg from a winding length of the tow prepreg and the amount of resin applied to the wound tow prepreg.

4. The tow prepreg manufacturing apparatus according to claim 1, wherein
   the resin reservoir is a box-shaped member and includes side walls that contact the oiling roller, and
   the resin reservoir supplies the oiling roller with resin from a groove formed by the side walls and a portion of a bottom surface of the resin reservoir.

5. The tow prepreg manufacturing apparatus according to claim 4, wherein
   the bottom surface of the resin reservoir includes parallel portions located between the side walls, and
   a lateral width between the side walls is narrowed in a stepped manner.

6. The tow prepreg manufacturing apparatus according to claim 3, further comprising:
   a third weight scale that detects the weight of resin that falls from a travel path of the tow prepreg at a downstream side of the oiling roller, wherein the controller calculates the amount of resin applied to the wound tow prepreg from output values of the first weight scale, the second weight scale, and the third weight scale.

7. A tow prepreg manufacturing apparatus that applies resin to an original tow of reinforcing fibers, the tow prepreg manufacturing apparatus comprising:
    an oiling roller supplied with resin while rotating at a predetermined rotation speed;
    a scraper that adjusts the shape of the resin supplied onto the oiling roller;
    a resin reservoir that supplies resin to the oiling roller;
    a tube pump that discharges resin to the resin reservoir; and
    a controller that controls the tube pump so that the amount of resin supplied from the resin reservoir remains constant and controls the rotation speed of the oiling roller so that a resin content of a wound tow prepreg becomes equal to a target resin content;
    further comprising:
    a first weight scale that detects the weight of the resin discharged from the tube pump; and
    a second weight scale that detects the weight of resin that falls from the oiling roller, wherein
    the controller calculates the amount of resin applied to the wound tow prepreg from an output value of the first weight scale and an output value of the second weight scale, and
    the controller calculates the resin content of the wound tow prepreg from a winding length of the tow prepreg and the amount of resin applied to the wound tow prepreg.

8. The tow prepreg manufacturing apparatus according to claim 7, further comprising:
    a liquid level sensor that detects a liquid level in the resin reservoir, wherein the controller controls a drive amount of the tube pump in accordance with liquid level information output from the liquid level sensor so that a liquid level height in the resin reservoir is held at a constant value.

9. The tow prepreg manufacturing apparatus according to claim 7, wherein the controller feedback-controls the rotation speed of the oiling roller in accordance with the resin content of the wound tow prepreg and the target resin content so that the amount of resin supplied from the oiling roller to the original tow converges the resin content of the wound tow prepreg on the target resin content.

10. The tow prepreg manufacturing apparatus according to claim 7, wherein
    the resin reservoir is a box-shaped member and includes side walls that contact the oiling roller, and
    the resin reservoir supplies the oiling roller with resin from a groove formed by the side walls and a portion of a bottom surface of the resin reservoir.

11. The tow prepreg manufacturing apparatus according to claim 10, wherein
    the bottom surface of the resin reservoir includes parallel portions located between the side walls, and
    a lateral width between the side walls is narrowed in a stepped manner.

12. The tow prepreg manufacturing apparatus according to claim 7, further comprising:
    a third weight scale that detects the weight of resin that falls from a travel path of the tow prepreg at a downstream side of the oiling roller,
    wherein the controller calculates the amount of resin applied to the wound tow prepreg from output values of the first weight scale, the second weight scale, and the third weight scale.

\* \* \* \* \*